(12) United States Patent
McIntyre et al.

(10) Patent No.: US 9,517,664 B2
(45) Date of Patent: Dec. 13, 2016

(54) RF TRANSMISSION METHOD AND APPARATUS IN A TIRE PRESSURE MONITORING SYSTEM

(71) Applicant: Continental Automotive Systems, Inc., Auburn Hills, MI (US)

(72) Inventors: Matthew D McIntyre, New Baltimore, MI (US); Jean-Christophe Deniau, Fenton, MI (US); Brian Farrell, Troy, MI (US); Yasser Gad, Macomb, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 23 days.

(21) Appl. No.: 14/627,440

(22) Filed: Feb. 20, 2015

(65) Prior Publication Data

US 2016/0243905 A1   Aug. 25, 2016

(51) Int. Cl.
| | |
|---|---|
| *B60C 23/00* | (2006.01) |
| *B60C 23/02* | (2006.01) |
| *H04L 29/08* | (2006.01) |
| *H04L 12/26* | (2006.01) |
| *H04W 52/22* | (2009.01) |

(52) U.S. Cl.
CPC ............. *B60C 23/02* (2013.01); *H04L 43/18* (2013.01); *H04L 67/12* (2013.01); *H04W 52/225* (2013.01)

(58) Field of Classification Search
CPC .................... B60C 23/0461; B60C 23/0433
USPC ... 340/447, 442, 426.33, 446, 448; 370/508, 370/394, 458
See application file for complete search history.

(56) References Cited

U.S. PATENT DOCUMENTS

| | | |
|---|---|---|
| 2,428,089 A | 9/1947 | Mumma et al. |
| 2,451,859 A | 10/1948 | Mumma et al. |
| 3,777,062 A | 12/1973 | Ogawa |
| 3,814,839 A | 6/1974 | Lubarsky et al. |
| 3,814,840 A | 6/1974 | Lubarsky et al. |
| 4,589,063 A | 5/1986 | Shah et al. |
| 4,703,359 A | 10/1987 | Rumbolt |
| 4,734,674 A | 3/1988 | Thomas et al. |
| 4,737,761 A | 4/1988 | Dosjoub et al. |
| 4,742,857 A | 5/1988 | Gandhi |
| 4,774,511 A | 9/1988 | Rumbolt et al. |
| 4,924,210 A | 5/1990 | Matsui et al. |
| 4,959,810 A | 9/1990 | Darbee |
| 4,999,622 A | 3/1991 | Amano et al. |
| 5,061,917 A | 10/1991 | Higgs et al. |
| 5,196,682 A | 3/1993 | Englehardt |

(Continued)

FOREIGN PATENT DOCUMENTS

| | | |
|---|---|---|
| CN | 1521027 A | 8/2004 |
| CN | 103503353 A | 1/2014 |

(Continued)

OTHER PUBLICATIONS

"Sony Remote Commander Operating Instructions RM-V701/V801", 1998, Sony Corporation.

(Continued)

*Primary Examiner* — Phung Nguyen

(57) ABSTRACT

In some aspects, a plurality of frames to be transmitted is assembled. The averaging factor is determined for each frame. Each frame is transmitted with the averaging power determined for each frame and not with the worst case averaging power from the plurality of frames.

18 Claims, 6 Drawing Sheets

(56) References Cited

U.S. PATENT DOCUMENTS

| | | |
|---|---|---|
| 5,201,067 A | 4/1993 | Grube |
| 5,223,844 A | 6/1993 | Mansel |
| 5,228,077 A | 7/1993 | Darbee |
| 5,231,872 A | 8/1993 | Bowler et al. |
| 5,243,430 A | 9/1993 | Emmons |
| 5,255,313 A | 10/1993 | Darbee |
| 5,303,259 A | 4/1994 | Loveall |
| 5,335,540 A | 8/1994 | Bowler et al. |
| 5,365,225 A | 11/1994 | Bachhuber |
| 5,414,761 A | 5/1995 | Darbee |
| 5,434,572 A | 7/1995 | Smith |
| 5,455,570 A | 10/1995 | Cook |
| 5,515,052 A | 5/1996 | Darbee |
| 5,537,463 A | 7/1996 | Escobosa |
| 5,540,092 A | 7/1996 | Handfield et al. |
| 5,552,917 A | 9/1996 | Darbee |
| 5,562,787 A | 10/1996 | Koch et al. |
| 5,564,101 A | 10/1996 | Eisfeld et al. |
| 5,581,023 A | 12/1996 | Handfield et al. |
| 5,585,554 A | 12/1996 | Handfield et al. |
| 5,600,301 A | 2/1997 | Robinson, III |
| 5,602,524 A | 2/1997 | Mock et al. |
| 5,614,906 A | 3/1997 | Hayes |
| 5,624,265 A | 4/1997 | Redford |
| 5,661,651 A | 8/1997 | Geschke et al. |
| 5,663,496 A | 9/1997 | Handfield et al. |
| 5,698,353 A | 12/1997 | Jeong |
| 5,706,247 A | 1/1998 | Merritt et al. |
| 5,731,516 A | 3/1998 | Handfield et al. |
| 5,731,763 A | 3/1998 | Herweck |
| 5,732,283 A | 3/1998 | Rose et al. |
| 5,741,966 A | 4/1998 | Handfield et al. |
| 5,768,499 A | 6/1998 | Treadway et al. |
| 5,808,558 A | 9/1998 | Meek et al. |
| 5,838,229 A | 11/1998 | Robinson, III |
| 5,841,390 A | 11/1998 | Tsui |
| 5,844,131 A | 12/1998 | Gabelmann et al. |
| 5,880,363 A | 3/1999 | Meyer et al. |
| 5,883,305 A | 3/1999 | Jo et al. |
| 5,900,808 A | 5/1999 | Lebo |
| 5,926,087 A | 7/1999 | Busch et al. |
| 5,959,751 A | 9/1999 | Darbee |
| 5,963,128 A | 10/1999 | McClelland |
| 5,965,808 A | 10/1999 | Normann et al. |
| 6,002,450 A | 12/1999 | Darbee |
| 6,005,486 A | 12/1999 | Fridley |
| 6,011,463 A | 1/2000 | Cormier, Sr. |
| 6,014,092 A | 1/2000 | Darbee |
| 6,018,993 A | 2/2000 | Normann et al. |
| 6,021,319 A | 2/2000 | Tigwell |
| 6,034,597 A | 3/2000 | Normann et al. |
| 6,078,270 A | 6/2000 | Shim |
| 6,087,930 A | 7/2000 | Kulka et al. |
| 6,112,165 A | 8/2000 | Uhl et al. |
| 6,124,786 A | 9/2000 | Normann et al. |
| 6,141,792 A | 10/2000 | Acker et al. |
| 6,154,658 A | 11/2000 | Casi |
| 6,155,119 A | 12/2000 | Normann et al. |
| 6,169,480 B1 | 1/2001 | Uhl et al. |
| 6,169,907 B1 * | 1/2001 | Chang ............... H04W 52/221 455/127.1 |
| 6,181,241 B1 | 1/2001 | Normann et al. |
| 6,192,747 B1 | 2/2001 | Fennel |
| 6,194,999 B1 | 2/2001 | Uhl et al. |
| 6,201,819 B1 | 3/2001 | Luders |
| 6,204,758 B1 | 3/2001 | Wacker et al. |
| 6,208,341 B1 | 3/2001 | van Ee et al. |
| 6,218,936 B1 | 4/2001 | Imao |
| 6,259,361 B1 | 7/2001 | Robillard et al. |
| 6,271,748 B1 | 8/2001 | Derbyshire et al. |
| 6,275,148 B1 | 8/2001 | Takamura et al. |
| 6,297,731 B1 | 10/2001 | Flick |
| 6,298,095 B1 | 10/2001 | Kronestedt et al. |
| 6,333,698 B1 | 12/2001 | Roddy |
| 6,362,731 B1 | 3/2002 | Lill |
| 6,369,703 B1 | 4/2002 | Lill |
| 6,396,408 B2 | 5/2002 | Drummond et al. |
| 6,400,263 B1 | 6/2002 | Kokubo |
| 6,408,232 B1 | 6/2002 | Cannon et al. |
| 6,438,467 B1 | 8/2002 | Pascai |
| 6,441,728 B1 | 8/2002 | Dixit et al. |
| 6,445,286 B1 | 9/2002 | Kessler et al. |
| 6,446,502 B1 | 9/2002 | Normann et al. |
| 6,453,737 B2 | 9/2002 | Young et al. |
| 6,463,798 B2 | 10/2002 | Niekirk et al. |
| 6,469,621 B1 | 10/2002 | Vredevogd et al. |
| 6,477,165 B1 | 11/2002 | Kosco |
| 6,486,773 B1 | 11/2002 | Bailie et al. |
| 6,489,888 B1 | 12/2002 | Honeck et al. |
| 6,490,452 B1 | 12/2002 | Boscovic et al. |
| 6,507,306 B1 | 1/2003 | Griesau |
| 6,518,891 B2 | 2/2003 | Tsutsui et al. |
| 6,567,032 B1 | 5/2003 | Mullaly |
| 6,571,617 B2 | 6/2003 | Van Niekerk et al. |
| 6,612,165 B2 | 9/2003 | Juzswik et al. |
| 6,622,552 B1 | 9/2003 | Delaporte |
| 6,630,885 B2 | 10/2003 | Hardman et al. |
| 6,633,229 B1 | 10/2003 | Normann et al. |
| 6,662,642 B2 | 12/2003 | Breed et al. |
| 6,667,687 B1 | 12/2003 | DeZori |
| 6,681,164 B2 | 1/2004 | Bergerhoff et al. |
| 6,693,522 B2 | 2/2004 | Tang et al. |
| 6,704,364 B1 | 3/2004 | Lim et al. |
| 6,705,155 B2 | 3/2004 | Katou |
| 6,710,708 B2 | 3/2004 | McClelland et al. |
| 6,731,205 B2 | 5/2004 | Schofield et al. |
| 6,737,965 B2 | 5/2004 | Okubo |
| 6,738,697 B2 | 5/2004 | Breed |
| 6,747,590 B1 | 6/2004 | Weber |
| 6,750,761 B1 | 6/2004 | Newman |
| 6,774,778 B2 | 8/2004 | Lin |
| 6,778,380 B2 | 8/2004 | Murray |
| 6,788,193 B2 | 9/2004 | King et al. |
| 6,794,993 B1 | 9/2004 | Kessler et al. |
| 6,801,872 B2 | 10/2004 | Normann et al. |
| 6,802,213 B1 | 10/2004 | Agrotis |
| 6,804,999 B2 | 10/2004 | Okubo |
| 6,822,603 B1 | 11/2004 | Crimmins et al. |
| 6,828,905 B2 | 12/2004 | Normann et al. |
| 6,832,573 B2 | 12/2004 | Evans et al. |
| 6,871,157 B2 | 3/2005 | Lefaure |
| 6,879,252 B2 | 4/2005 | DeZorzi et al. |
| 6,885,282 B2 | 4/2005 | Desai |
| 6,885,292 B2 | 4/2005 | Katou |
| 6,885,293 B2 | 4/2005 | Okumura |
| 6,885,296 B2 | 4/2005 | Hardman et al. |
| 6,888,471 B2 | 5/2005 | Elsner et al. |
| 6,897,770 B2 | 5/2005 | Lill |
| 6,904,796 B2 | 6/2005 | Pacsai et al. |
| 6,906,624 B2 | 6/2005 | McClelland et al. |
| 6,910,627 B1 | 6/2005 | Simpson-Young et al. |
| 6,914,523 B2 | 7/2005 | Munch et al. |
| 6,915,146 B2 | 7/2005 | Nguyen et al. |
| 6,915,229 B2 | 7/2005 | Taguchi et al. |
| 6,919,798 B2 | 7/2005 | Ide |
| 6,920,785 B2 | 7/2005 | Toyofuku |
| 6,922,140 B2 | 7/2005 | Hernando et al. |
| 6,927,679 B2 | 8/2005 | Taguchi et al. |
| 6,941,803 B2 | 9/2005 | Hirohama et al. |
| 6,972,671 B2 | 12/2005 | Normann et al. |
| 6,983,649 B2 | 1/2006 | Katou |
| 6,996,418 B2 | 2/2006 | Teo et al. |
| 7,002,455 B2 | 2/2006 | Buck et al. |
| 7,010,968 B2 | 3/2006 | Stewart et al. |
| 7,015,801 B1 | 3/2006 | Juzswik |
| 7,017,403 B2 | 3/2006 | Normann et al. |
| 7,034,661 B2 | 4/2006 | Lonsdale et al. |
| 7,039,397 B2 | 5/2006 | Chuey |
| 7,042,348 B2 | 5/2006 | Schulze et al. |
| 7,050,794 B2 | 5/2006 | Chuey et al. |
| 7,084,749 B1 | 8/2006 | Honeck et al. |
| 7,084,751 B2 | 8/2006 | Klamer |
| 7,088,226 B2 | 8/2006 | McClelland et al. |
| 7,095,316 B2 | 8/2006 | Kachouh et al. |

(56) References Cited

U.S. PATENT DOCUMENTS

| | | |
|---|---|---|
| 7,096,003 B2 | 8/2006 | Joao et al. |
| 7,103,460 B1 | 9/2006 | Breed |
| 7,104,438 B2 | 9/2006 | Benedict |
| 7,113,083 B2 | 9/2006 | Suitsu |
| 7,116,213 B2 | 10/2006 | Thiesen et al. |
| 7,116,218 B2 | 10/2006 | Ogawa et al. |
| 7,120,430 B2 | 10/2006 | Christenson et al. |
| 7,137,296 B2 | 11/2006 | Shida et al. |
| 7,148,793 B2 | 12/2006 | Lin |
| 7,161,466 B2 | 1/2007 | Chuey |
| 7,161,476 B2 | 1/2007 | Hardman et al. |
| 7,164,117 B2 | 1/2007 | Breed et al. |
| 7,173,520 B2 | 2/2007 | Desai et al. |
| 7,224,269 B2 | 5/2007 | Miller et al. |
| 7,243,535 B2 | 7/2007 | Shimura |
| 7,254,994 B2 | 8/2007 | Schulze et al. |
| 7,307,480 B2 | 12/2007 | Shiu et al. |
| 7,315,240 B2 | 1/2008 | Watabe |
| 7,318,162 B2 | 1/2008 | Rineer et al. |
| 7,369,491 B1 | 5/2008 | Beshai et al. |
| 7,380,450 B2 | 6/2008 | Durif |
| 7,382,239 B2 | 6/2008 | Song et al. |
| 7,414,523 B2 | 8/2008 | Li et al. |
| 7,453,350 B2 | 11/2008 | Kachouh et al. |
| 7,478,554 B2 | 1/2009 | Roth et al. |
| 7,508,762 B2 | 3/2009 | Ohtani |
| 7,512,109 B2 | 3/2009 | Trott et al. |
| 7,518,495 B2 | 4/2009 | Tang et al. |
| 7,519,011 B2 | 4/2009 | Petrus et al. |
| 7,535,841 B1 | 5/2009 | Beshai et al. |
| 7,642,904 B2 | 1/2010 | Crano |
| 7,663,502 B2 | 2/2010 | Breed |
| 7,688,192 B2 | 3/2010 | Kenny et al. |
| 7,697,497 B2 | 4/2010 | Grube et al. |
| 7,817,543 B2 | 10/2010 | Beshai et al. |
| 7,884,707 B2 | 2/2011 | Wittliff et al. |
| 7,885,603 B2 | 2/2011 | Santavicca |
| 7,895,886 B2 | 3/2011 | Tozawa et al. |
| 7,900,198 B2 | 3/2011 | Kasman |
| 7,948,364 B2 | 5/2011 | Lin et al. |
| 8,013,725 B2 | 9/2011 | Murata et al. |
| 8,015,864 B2 | 9/2011 | Petrucelli |
| 8,019,323 B2 | 9/2011 | Jheng et al. |
| 8,027,359 B2 | 9/2011 | Iwamura |
| 8,031,598 B2 | 10/2011 | Beshai et al. |
| 8,035,257 B2 | 10/2011 | Fornage |
| 8,049,533 B1 | 11/2011 | Lin |
| 8,082,579 B2 | 12/2011 | Shimizu et al. |
| 8,155,617 B2 | 4/2012 | Magnusson et al. |
| 8,185,093 B2 | 5/2012 | Jheng et al. |
| 8,319,378 B2 | 11/2012 | Fornage |
| 8,330,594 B2 | 12/2012 | Suzuki et al. |
| 8,332,104 B2 | 12/2012 | Greer et al. |
| 8,576,060 B2 * | 11/2013 | Deniau ............... B60C 23/0462 340/426.33 |
| 9,259,980 B2 | 2/2016 | Deniau et al. |
| 2001/0050611 A1 | 12/2001 | Achterholt |
| 2002/0030592 A1 | 3/2002 | Laitsaari et al. |
| 2002/0059825 A1 | 5/2002 | Lundqvist |
| 2002/0067285 A1 | 6/2002 | Lill |
| 2002/0075145 A1 | 6/2002 | Hardman et al. |
| 2002/0084895 A1 | 7/2002 | Dixit et al. |
| 2002/0086708 A1 | 7/2002 | Teo et al. |
| 2002/0087250 A1 | 7/2002 | Pascai |
| 2002/0121132 A1 | 9/2002 | Breed et al. |
| 2002/0126005 A1 | 9/2002 | Hardman et al. |
| 2002/0130803 A1 | 9/2002 | Conway et al. |
| 2002/0144134 A1 | 10/2002 | Watanabe et al. |
| 2002/0168795 A1 | 11/2002 | Schuumans |
| 2002/0186320 A1 | 12/2002 | Carlsgaard |
| 2002/0190852 A1 | 12/2002 | Lin |
| 2003/0005759 A1 | 1/2003 | Breed et al. |
| 2003/0009270 A1 | 1/2003 | Breed |
| 2003/0030553 A1 | 2/2003 | Schofield et al. |
| 2003/0050070 A1 | 3/2003 | Mashinsky et al. |
| 2003/0071723 A1 | 4/2003 | Tang et al. |
| 2003/0079537 A1 | 5/2003 | Luce |
| 2003/0080860 A1 | 5/2003 | Stewart et al. |
| 2003/0080861 A1 | 5/2003 | Okubo |
| 2003/0095553 A1 | 5/2003 | Shiomoto et al. |
| 2003/0110851 A1 | 6/2003 | Tsujita |
| 2003/0112138 A1 | 6/2003 | Marguet et al. |
| 2003/0117276 A1 | 6/2003 | Marguet et al. |
| 2003/0117277 A1 | 6/2003 | Marguet et al. |
| 2003/0122660 A1 * | 7/2003 | Kachouh ............ B60C 23/0464 340/442 |
| 2003/0131297 A1 | 7/2003 | Fischel et al. |
| 2003/0179082 A1 | 9/2003 | Ide |
| 2003/0197594 A1 | 10/2003 | Olson et al. |
| 2003/0197595 A1 | 10/2003 | Olson et al. |
| 2003/0197603 A1 | 10/2003 | Stewart et al. |
| 2003/0197604 A1 | 10/2003 | Ogawa et al. |
| 2003/0201783 A1 | 10/2003 | Steber et al. |
| 2003/0228879 A1 | 12/2003 | Witkowski |
| 2004/0027241 A1 | 2/2004 | Forster |
| 2004/0039509 A1 | 2/2004 | Breed |
| 2004/0041698 A1 | 3/2004 | Lin |
| 2004/0061601 A1 | 4/2004 | Freakes |
| 2004/0113765 A1 | 6/2004 | Suitsu |
| 2004/0130442 A1 | 7/2004 | Breed et al. |
| 2004/0149025 A1 | 8/2004 | Toyofuku |
| 2004/0172179 A1 | 9/2004 | Miwa |
| 2004/0174246 A1 | 9/2004 | Mitchell |
| 2004/0203370 A1 | 10/2004 | Luo et al. |
| 2004/0215382 A1 | 10/2004 | Breed et al. |
| 2005/0024194 A1 | 2/2005 | Ide |
| 2005/0039103 A1 | 2/2005 | Azenko et al. |
| 2005/0046584 A1 | 3/2005 | Breed |
| 2005/0075145 A1 | 4/2005 | Dvorak et al. |
| 2005/0104722 A1 | 5/2005 | Tang et al. |
| 2005/0132792 A1 | 6/2005 | Lemense et al. |
| 2005/0134446 A1 | 6/2005 | Stewart et al. |
| 2005/0156722 A1 | 7/2005 | McCall et al. |
| 2005/0179530 A1 | 8/2005 | Stewart et al. |
| 2005/0192727 A1 | 9/2005 | Shostak et al. |
| 2005/0264405 A1 | 12/2005 | Ueda |
| 2006/0001535 A1 | 1/2006 | Hafele et al. |
| 2006/0006992 A1 | 1/2006 | Daiss et al. |
| 2006/0012475 A1 | 1/2006 | Froitzheim et al. |
| 2006/0017554 A1 | 1/2006 | Stewart et al. |
| 2006/0022813 A1 | 2/2006 | Schulze et al. |
| 2006/0025897 A1 | 2/2006 | Shostak et al. |
| 2006/0044125 A1 | 3/2006 | Pierbon |
| 2006/0114107 A1 | 6/2006 | Kim et al. |
| 2006/0145829 A1 | 7/2006 | Watabe |
| 2006/0148456 A1 | 7/2006 | Chuey |
| 2006/0152342 A1 | 7/2006 | Turner et al. |
| 2006/0161327 A1 | 7/2006 | Emmerich et al. |
| 2006/0187014 A1 | 8/2006 | Li et al. |
| 2006/0192661 A1 | 8/2006 | Geradiere |
| 2006/0201241 A1 | 9/2006 | Durif |
| 2006/0217850 A1 | 9/2006 | Geerlings et al. |
| 2006/0235641 A1 | 10/2006 | Fink et al. |
| 2006/0273889 A1 | 12/2006 | Schulze et al. |
| 2006/0277989 A1 | 12/2006 | Lee et al. |
| 2007/0063814 A1 | 3/2007 | Olson et al. |
| 2007/0069947 A1 | 3/2007 | Banet et al. |
| 2007/0090936 A1 | 4/2007 | Nornes |
| 2007/0176736 A1 | 8/2007 | Chuey et al. |
| 2007/0182531 A1 | 8/2007 | Kuchler |
| 2007/0190993 A1 | 8/2007 | Chuey et al. |
| 2007/0194898 A1 | 8/2007 | Fukumori |
| 2007/0210920 A1 | 9/2007 | Panotopoulos |
| 2007/0213951 A1 | 9/2007 | Van Eeden |
| 2007/0223484 A1 | 9/2007 | Crowle et al. |
| 2007/0247294 A1 | 10/2007 | Baader et al. |
| 2007/0279201 A1 | 12/2007 | Casey et al. |
| 2008/0001729 A1 | 1/2008 | Kyllmann et al. |
| 2008/0024287 A1 | 1/2008 | Boyle et al. |
| 2008/0037458 A1 | 2/2008 | Myszne |
| 2008/0062880 A1 | 3/2008 | Yew et al. |
| 2008/0080447 A1 | 4/2008 | Grube et al. |
| 2008/0094198 A1 | 4/2008 | Yu |
| 2008/0100430 A1 | 5/2008 | Kochie et al. |

(56) References Cited

U.S. PATENT DOCUMENTS

| | | |
|---|---|---|
| 2008/0141766 A1 | 6/2008 | Roth et al. |
| 2008/0143593 A1 | 6/2008 | Graziano et al. |
| 2008/0157954 A1 | 7/2008 | Tsuchida |
| 2008/0165688 A1 | 7/2008 | Beshai et al. |
| 2008/0173082 A1 | 7/2008 | Hettle et al. |
| 2008/0177441 A1 | 7/2008 | Marlett et al. |
| 2008/0204217 A1 | 8/2008 | Costello et al. |
| 2008/0205553 A1 | 8/2008 | Costello et al. |
| 2008/0211672 A1 | 9/2008 | Pei |
| 2008/0240283 A1* | 10/2008 | Iwamura ............. G08C 23/04 375/295 |
| 2008/0256260 A1 | 10/2008 | Magnusson et al. |
| 2008/0282965 A1 | 11/2008 | Crano |
| 2008/0285507 A1 | 11/2008 | Mukherjee et al. |
| 2008/0320243 A1 | 12/2008 | Mitsuzuka et al. |
| 2009/0021362 A1 | 1/2009 | Kochie |
| 2009/0033478 A1 | 2/2009 | Deniau et al. |
| 2009/0045930 A1 | 2/2009 | Fu |
| 2009/0067854 A1 | 3/2009 | Yokogawa et al. |
| 2009/0070863 A1 | 3/2009 | Shimizu et al. |
| 2009/0108992 A1 | 4/2009 | Shafer |
| 2009/0109012 A1 | 4/2009 | Petrucelli |
| 2009/0179747 A1 | 7/2009 | Lin et al. |
| 2009/0184815 A1 | 7/2009 | Suzuki et al. |
| 2009/0207859 A1 | 8/2009 | Beshai et al. |
| 2009/0224901 A1 | 9/2009 | Yu |
| 2009/0231114 A1 | 9/2009 | Yu |
| 2009/0245803 A1 | 10/2009 | Garner et al. |
| 2009/0267751 A1 | 10/2009 | Kaleal |
| 2009/0291710 A1 | 11/2009 | Jheng et al. |
| 2009/0310477 A1 | 12/2009 | Lee et al. |
| 2010/0071453 A1 | 3/2010 | Isono |
| 2010/0308987 A1 | 12/2010 | Haas et al. |
| 2011/0140876 A1 | 6/2011 | Deniau |
| 2011/0181321 A1 | 7/2011 | Matsudera |
| 2011/0211414 A1 | 9/2011 | Musha |
| 2011/0250860 A1 | 10/2011 | Lin |
| 2011/0267024 A1 | 11/2011 | Halberstadt |
| 2011/0294548 A1 | 12/2011 | Jheng et al. |
| 2012/0001745 A1 | 1/2012 | Li |
| 2012/0117788 A1 | 5/2012 | Deniau |
| 2012/0119895 A1 | 5/2012 | Deniau |
| 2012/0139751 A1 | 6/2012 | Lin |
| 2012/0147184 A1 | 6/2012 | Siann et al. |
| 2012/0185110 A1 | 7/2012 | Deniau et al. |
| 2012/0274461 A1 | 11/2012 | Colombo et al. |
| 2013/0282231 A1 | 10/2013 | Farr et al. |
| 2014/0139332 A1 | 5/2014 | Mouchet |
| 2015/0015389 A1 | 1/2015 | McIntyre et al. |
| 2015/0015390 A1 | 1/2015 | McIntyre et al. |

FOREIGN PATENT DOCUMENTS

| | | |
|---|---|---|
| DE | 4492128 | 6/1996 |
| DE | 19503756 | 8/1996 |
| DE | 19720123 | 7/1998 |
| DE | 19924830 | 11/2000 |
| DE | 10014076 | 10/2001 |
| DE | 10040238 | 3/2002 |
| DE | 10247761 | 6/2003 |
| DE | 10217239 | 7/2003 |
| DE | 10207014 | 8/2003 |
| DE | 10307265 | 10/2003 |
| DE | 69529456 | 11/2003 |
| DE | 10247149 | 4/2004 |
| DE | 60108973 | 7/2005 |
| DE | 60202342 | 12/2005 |
| DE | 60023387 | 7/2006 |
| DE | 102005004825 | 8/2006 |
| DE | 102005059009 | 6/2007 |
| DE | 102007039599 | 3/2008 |
| DE | 102008008237 | 8/2009 |
| DE | 102008033051 | 2/2010 |
| EP | 793579 | 9/1997 |
| EP | 1013483 A2 | 6/2000 |
| EP | 1026016 | 8/2000 |
| EP | 1291230 | 3/2003 |
| EP | 1428694 A2 | 12/2003 |
| EP | 1440824 A2 | 7/2004 |
| EP | 1494877 | 1/2005 |
| EP | 1536392 A1 | 6/2005 |
| EP | 1547827 | 6/2005 |
| EP | 1562162 | 8/2005 |
| EP | 1026015 | 5/2006 |
| EP | 1674299 A2 | 6/2006 |
| EP | 1352763 | 4/2008 |
| EP | 1340629 | 6/2008 |
| GB | 2387032 | 10/2003 |
| GB | 2420415 | 5/2006 |
| GB | 2500697 A | 10/2013 |
| JP | 62003537 | 1/1987 |
| JP | 63090407 A | 4/1988 |
| JP | 05107134 | 4/1993 |
| JP | 8244423 | 9/1996 |
| JP | 2000142044 | 5/2000 |
| JP | 2000238515 | 9/2000 |
| JP | 2001080321 | 3/2001 |
| JP | 2001312860 A | 9/2001 |
| JP | 2002064404 A | 2/2002 |
| JP | 2003025817 | 1/2003 |
| JP | 2003-312220 | 11/2003 |
| JP | 2004-145474 | 5/2004 |
| JP | 2005289116 | 10/2005 |
| JP | 2006015832 | 1/2006 |
| JP | 2007010427 A | 1/2007 |
| JP | 2007200081 | 8/2007 |
| JP | 2007283816 | 11/2007 |
| JP | 2008137585 | 6/2008 |
| JP | 4265448 B2 | 2/2009 |
| JP | 5502729 B2 | 5/2014 |
| KR | 2003068216 | 8/2003 |
| KR | 1020070040883 A | 4/2007 |
| KR | 10-2009-0091001 | 8/2009 |
| RU | 38461 U1 | 6/2004 |
| RU | 2238190 | 10/2004 |
| RU | 2398680 C2 | 6/2006 |
| RU | 2409480 C2 | 7/2006 |
| RU | 2352473 C1 | 4/2009 |
| WO | 9420317 | 9/1994 |
| WO | 9422693 | 10/1994 |
| WO | 9908887 | 2/1999 |
| WO | 0072463 | 11/2000 |
| WO | 0145967 | 6/2001 |
| WO | 02094588 | 11/2002 |
| WO | 03016079 | 2/2003 |
| WO | 2004038674 | 5/2004 |
| WO | 2005065651 | 9/2005 |
| WO | 2005116603 | 12/2005 |
| WO | 2007/006871 A1 | 1/2007 |
| WO | 2009006518 | 1/2008 |
| WO | 2008-103973 A1 | 8/2008 |
| WO | 2008106387 | 9/2008 |
| WO | 2008107430 | 9/2008 |
| WO | 2012/097154 A1 | 7/2012 |
| WO | 2013/063061 A1 | 5/2013 |
| WO | 2013/152294 A1 | 10/2013 |
| WO | 2015/015692 A1 | 2/2015 |

OTHER PUBLICATIONS

"Philips Magnavox 4 Function with Back Lighted Keypad Universal Remote" Operating Instructions, printed Oct. 2012, Philips Electronics North America Corporation.
"RadioShack 8-In-One Touch Screen Remote Control", Owner's Manual, 2001, RadioShack Corporation.
Kais Mnif, "A Smart Tire Pressure Monitoring System", Sensors Magazine, Nov. 1, 2001.
International Search Report and Written Opinion dated Sep. 28, 2012, from corresponding International Patent Application No. PCT/US2011/047112.
International Search Report dated Apr. 6, 2012, from corresponding International Patent Application No. PCT/US2011/047087.

(56) References Cited

OTHER PUBLICATIONS

International Search Report and Written Opinion mailed on Oct. 15, 2008, for Application No. PCT/US2008/069006.
International Preliminary Report on Patentability mailed on Jan. 14, 2010, for Application No. PCT/US2008/069006.
Chinese Office Action mailed on Apr. 19, 2011, for Chinese Application 200880023390.7 (Corresponding to PCT/US2008/069006).
Chinese Office Action (second) mailed on Feb. 16, 2012, for Chinese Application 200880023390.7 (Corresponding to PCT/US2008/069006).
Chinese Office Action (third) mailed on Oct. 10, 2012, for Chinese Application 200880023390.7 (Corresponding to PCT/US2008/069006).
Japanese Office Action mailed on Jun. 7, 2012, for JP Application 2010-515252 (Corresponding to PCT/US2008/069006).
International Search Report and Written Opinion dated Sep. 28, 2012, from corresponding International Patent Application No. PCT/US2011/047104.
Germany Office Action dated Nov. 19, 2012.
Germany Office Action dated Sep. 17, 2007.
Preliminary Invalidity Contentions of Defendant Continental Automotive Systems US, Inc.; dated Jan. 17, 2012, , In the United States District Court for Western District of Virginia Lynchburg Division, Civil Action No. 6:11-CV-00014-NKM.
Amended Invalidity Contentions of Defendant Continental Automotive Systems US, Inc.; dated Jun. 18, 2012, , In the United States District Court for Eastern District of Michigan Southern Division, Civil Action No. 2:12-cv-10715-SJM-MJH.
Plaintiffs' Initial Infringement Contentions; dated Dec. 15, 2011, In The United States District Court for Western District of Virginia Lynchburg Division, Civil Action No. 6:11-CV-00014-NKM-RSB.
Joint Claim Construction and Prehearing Statement, dated Jun. 11, 2012, from co-pending litigation: *Schrader-Bridgeport Int'l, Inc.* v. *Continental Automotive Sys, US, Inc.*, case docket No. 2:12-CV-10715-SJM-MJH, (filed Feb. 16, 2012, E.D. Mich.).
Plaintiffs' Opening Claim Construction Brief, dated Jun. 26, 2012, from co-pending litigation: *Schrader-Bridgeport Int'l, Inc.* v. *Continental Automotive Sys. US, Inc.*, case docket No. 2:12-cv-10715-SJM-MJH, (filed Feb. 16, 2012, E.D. Mich.).
USPTO Translation of JP2003025817A, translated from Japanese by Schreiber Translations, Inc., Feb. 2013.
Jeff Burgess, "TPMS Demonstration Kit", AN1943/D, Rev 1, Apr. 2002, Motorola, Inc., 2002 (16 pgs.).
Jeff Burgess, "Tire Pressure Monitoring System Reference Design", Tire Pressure Monitor System Demo, AN1951/D, Rev 1, May 2003, Motorola, Inc., 2003 (24 pgs.).
"Motorola's MPXY8000 Series Tire Pressure Monitoring Sensors", Motorola Sensor Products Division Transportation & Standard Products Group, Motorola, Inc., May 2003 (22 pgs.).
Alfred Pohl et al. "Wirelessly Interrogable Surface Acoustic Wave Sensors for Vehicular Applications", IEEE Transactions on Instrumentation and Measurement vol. 46, No. 4, IEEE, Aug. 1997 (8 pgs..).
"Tire pressure Warning System Using Direct Measurement Method (SOARER)" G0880A ISSN: 0388-3841, vol. 51 No. 7, pp. 174-179, Toyota Motor Corporation, May 2, 2002 (6 pgs.).
Search Report dated Aug. 20, 2015, from corresponding GB Patent Application No. GB1503824.3.
International Search Report and Written Opinion dated Sep. 28, 2012, from corresponding International Patent Application No. PCT/US2011/047108.
Search Report dated Jun. 20, 2014, from EP Patent Application No. 11870613.4.
Search Report dated Jun. 30, 2014, from EP Patent Application No. 11870701.7.
Search Report dated Mar. 24, 2015, from EP Patent Application No. 11870650.6.
Search Report dated Apr. 19, 2012, from International Patent Application No. PCT/US2012/021082.

\* cited by examiner

RF TRANSMISSION METHOD AND APPARATUS IN A TIRE PRESSURE MONITORING SYSTEM

TECHNICAL FIELD

This application relates to tire pressure monitors, and more specifically, the operation of these devices.

BACKGROUND OF THE INVENTION

Tire pressure monitoring (TPM) sensors are deployed that take the pressure (and possibly other readings such as temperature) of the tire of the vehicle. The sensors transmit the tire pressure data (and possibly other data) to a receiver (e.g., electronic control unit) in a vehicle. The receiver may compare the measured pressure to a threshold and if the measured pressure is below a threshold, issue an alert to a driver.

In many jurisdictions, the operation of these devices is subject to government regulation. For instance, in the United States the Federal Communications Commission (FCC) regulates various aspects of the operation of TPM sensors. Other jurisdictions may be regulated by other agencies. In one example, the FCC regulates the average power and the maximum peak power of the sensors.

The regulations imposed on the sensors govern the amount and timing of transmission of information. Unfortunately, previous TPM systems were sometimes performance-limited by these rules and regulations. These problems have resulted in some user dissatisfaction with these previous approaches.

BRIEF DESCRIPTION OF THE DRAWINGS

For a more complete understanding of the disclosure, reference should be made to the following detailed description and accompanying drawings wherein.

Figure 1:
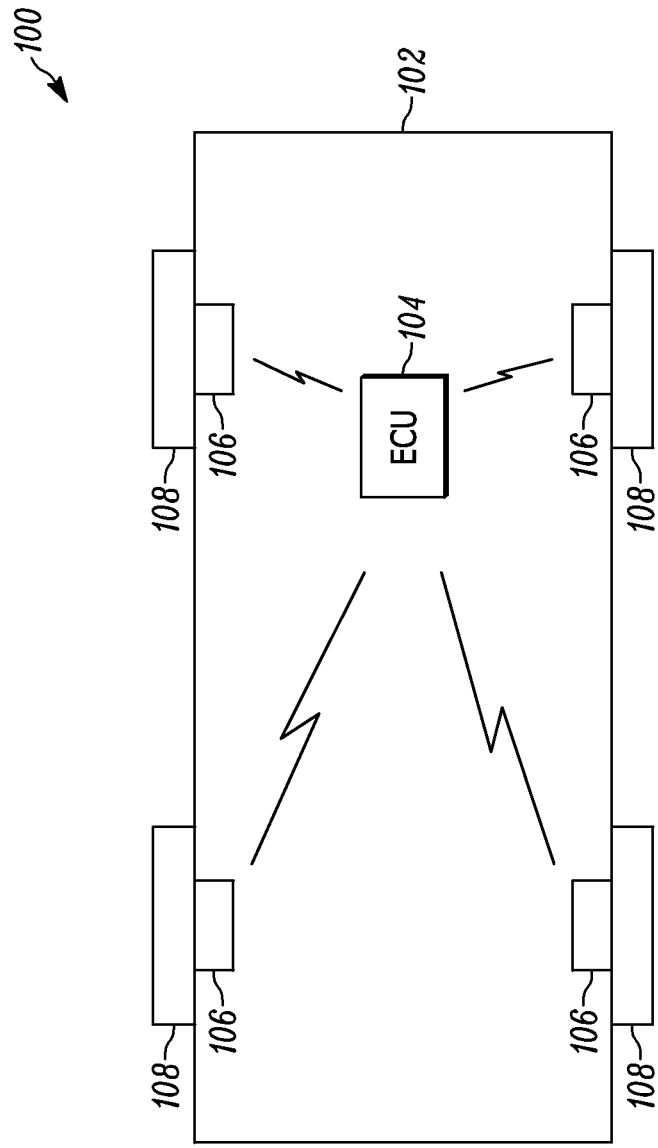
FIG. 1 comprises a block diagram of a TPM system according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

The present approaches provided that adjust the power, size, number of frames and/or number of bits transmitted in frames of tire pressure monitoring (TPM) sensor transmissions. The approaches are flexible, cost effective, and increase the the probability that the information is received from the sensor by the receiver all while remaining within applicable government (e.g., FCC) regulations.

In many of these embodiments, a plurality of frames to be transmitted is assembled. The (power) averaging factor is determined for each frame. Each frame is transmitted with the averaging factor determined for each frame and not with the worst case averaging factor from the plurality of frames.

In other aspects, each frame is transmitted to a receiver in the vehicle. In other examples, the receiver makes a decision as to whether the pressure is below a predetermined threshold.

In some other aspects, each of the frames has a protocol of a different automobile manufacturer. In other examples, the frames are transmitted at approximately 315 Mhz or at approximately 433.92 Mhz. Other examples are possible.

In some of these embodiments, a plurality of frames to be transmitted is received and each of the plurality of frames is separated by a first inter frame timing distance. The averaging factor for each of the plurality of frames, and a worst case averaging factor are determined. A second inter frame timing distance that separates each of the plurality of frames is determined and the second inter frame timing distance is less than the first inter frame timing distance. The frames are assembled into a transmission burst and these frames are separated with the second inter frame timing distance. An additional frame is inserted into the transmission burst. Each of the frames of the transmission burst is transmitted with the worst case averaging factor.

In some aspects, the additional frame is duplicative of one of the first frames. In other aspects, the additional frame includes additional information from the first frames.

In some of these embodiments, a plurality of frames to be transmitted is received and each of the frames is separated by a first inter frame timing distance. An averaging factor for each frame, a worst case averaging factor, and a frame associated with the worst case averaging factor are determined. The frames are assembled into a transmission burst. Additional bits are inserted into the preamble of selected frames in the transmission burst. The transmission burst is transmitted with the averaging power determined for the worst case averaging power from the plurality of frames. In some aspects, the selected frames do not have the worst case averaging factor.

In some of these embodiments, an apparatus configured to increase transmission performance between a tire pressure monitoring (TPM) sensor and a receiver in a vehicle includes an interface and a controller. The interface has an input and output, and the input configured to receive a plurality of frames to be transmitted.

The controller is coupled to the interface, and the controller is configured to determine an averaging factor for each frame and to transmit at the output each frame with the averaging power determined for each frame and not with the worst case averaging power from the plurality of frames.

In some of these embodiments, an apparatus configured to increase transmission performance between a tire pressure monitoring (TPM) sensor and a receiver in a vehicle includes an interface and a controller. The interface includes an input and an output, and the input is configured to receive a plurality of frames, each of the frames being separated by a first inter frame timing distance.

The controller is coupled to the interface and is configured to determine the averaging factor for each of the plurality of frames and a worst case averaging factor. The controller is further configured to determine a second inter frame timing distance that separates each of the plurality of frames, the second inter frame timing distance being less than the first inter frame timing distance. The controller is configured to assemble the frames into a transmission burst and separate these frames with the second inter frame timing distance. The controller is further configured to insert an additional frame into the transmission burst and transmit the transmission burst at the output of the interface, each frame of the transmission burst being transmitted with the worst case averaging factor of the plurality of frames.

In some of these embodiments, an apparatus configured to increase transmission performance between a tire pressure monitoring (TPM) sensor and a receiver in a vehicle includes an interface and a controller. The interface has an input and an output, and the input configured to receive a plurality of frames to be transmitted, each of the first frames being separated by a first inter frame timing distance.

The controller is coupled to the interface and is configured to determine an averaging factor for each frame, a worst case averaging factor for the plurality of frames, and the frame associated with the worst case averaging factor. The controller is further configured to assemble the first frames to be transmitted into a transmission burst, to insert additional bits into the preamble of selected frames in the transmission burst, and to transmit the transmission burst at the output with the worst case averaging power.

Referring now to FIG. 1, one example of a tire pressure monitoring (TPM) system 100 is described. The system 100 includes a vehicle 102, an electronic control unit (ECU) (receiver) 104, and TPM sensors 106 (disposed at tires 108).

One or more frames of information are assembled into burst by the TPM sensors 106 and transmitted by the TPM sensors 106 to the ECU 104. When multiple frames are transmitted, each of these frames may each be transmitted according to a different protocol. The particular protocol used by TPM sensors 106 to transmit a frame within a burst may relate to a different manufacturer and may have different characteristics such as frequency, baud rate, and so forth. In other words, each automobile manufacturer may have a different protocol and the same sensed information may be transmitted in multiple frames having varying protocols. The frames include a header portion and a payload portion. In one example, the header portion may include various bits (e.g., ones and zeros). In another aspect, the frames may be transmitted using Manchester encoding techniques. The payload portion may include the pressure data from a tire as well as other information (e.g., temperature data).

The electronic control unit (ECU) 104 receives information from the sensors 106, processes the information, and determines whether alerts should be displayed to the user, for example, when the pressure sensed by a sensor 106 falls below a predetermined threshold. The alerts may be in the form of an audible or visual alarm to the user, or may include a transmission (e.g., via a wireless link) to a third party (e.g., an emergency service center).

It will be appreciated that the FCC allows a maximum peak power of 67.66 db uV/m at 3 meters plus an averaging factor (for 315 MHz) or 72.86 db uV/m at 3 meters plus a averaging factor (for 433.92 MHz). It can be shown that the maximum averaging factor is 20 db uV/m in both cases.

The averaging factor of multi-application TPM sensors is associated with the worst case averaging factor of the RF frame or frames sent in a burst. More specifically, a burst includes multiple frames. Each of the frames has an averaging factor. The worst case averaging factor is the lowest averaging factor for all frames. In one example, the power is adjusted for each frame.

The averaging factor for each frame can be determined by applying a 100 ms window to the burst to examine the frames of the burst. The window is slid over the burst (from start to end). Within the sliding window, the maximum time of transmitting is ascertained. The averaging factor relates to $20*\log(p_{on}/100)$ where $p_{on}$ is the amount of time the transmitting is occurring. If $p_{on}$ is 10, then the averaging factor becomes its maximum (20 db uV/m).

In some of the approaches described herein, the TPM sensor 106 dynamically adjusts the gain of the RF power of the intentional radiator (antenna) at the TPMS sensor 106 for each frame in the burst. This approach is different than the approaches of previous systems where the gain of every frame in a burst is the same and is, in fact, uses the worst case averaging factor. With the approaches presented herein, there is increased chance that all the frames are received at the receiver.

In other aspects, the TPM sensors 106 minimize or shorten the inter frame timing space between frames in a burst so that additional information can be appended at the end of the burst. This functionality can be performed at design time or can be dynamically performed. When performed dynamically, each burst is examined individually on-the-fly, and the amount the inter frame time that is shortened and the amount of information appended to the end of the burst changes with each burst.

In other aspects, the TPM sensors 106 adds bits to the preamble of the headers that do not have the worst case power averaging factor. This functionality can be implemented at design time or dynamically performed. When performed dynamically, each burst is examined individually on-the-fly, and the amount the bits added to the preambles of the headers that do not have the worst case power averaging factor is adjusted. In other examples, bits can be added to the preambles of all frames in the burst.

Figure 2A:
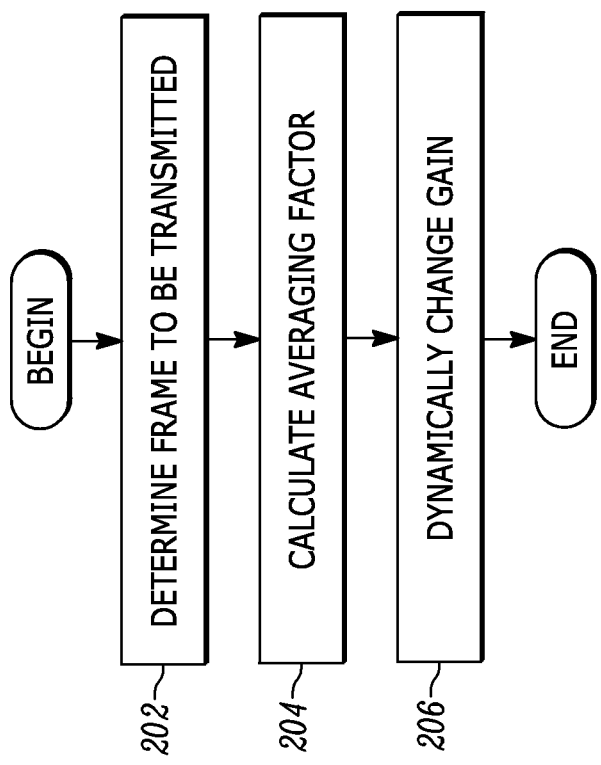
FIG. 2A and 2B comprises a flowchart and block diagram showing one approach to transmitting TPM data according to various embodiments of the present invention.

Referring now to FIG. 2A, one approach for transmitting information from a TPMS sensor is described. In this example, the TPM sensor dynamically changes the gain of the RF power based upon the averaging factor of the next RF burst. More specifically, the averaging factor for each frame can be determined by applying a 100 ms window to the burst to examine the frames of the burst. The window is slid over the entire burst (from start to end). Within the sliding window, the maximum time of transmitting is ascertained. The averaging factor relates to $20*\log(p_{on}/100)$ where $p_{on}$ is the amount of time the transmitting is occurring. If $p_{on}$ is 10, then the averaging factor becomes its maximum (20 db uV/m).

At step 202, frames to be transmitted are received and a frame to be transmitted is determined. At step 204, the TPM sensor calculates the averaging factor for each frame. This can be determined by applying a 100 ms moving window across the whole burst. Each of these frames may each be transmitted according to a different protocol. The particular protocol used to transmit a frame within a burst may relate to a different manufacturer and may have different characteristics such as frequency, baud rate, and so forth. In other words, each automobile manufacturer may have a different protocol and the same sensed information may be transmitted in multiple frames having varying protocols. The frames include a header portion and a payload portion.

At step 206, the sensor dynamically changes the gain of the RF power of the intentional radiator (antenna) based on the averaging factor of each frame as it transmits the frames via an antenna.

Figure 2B:
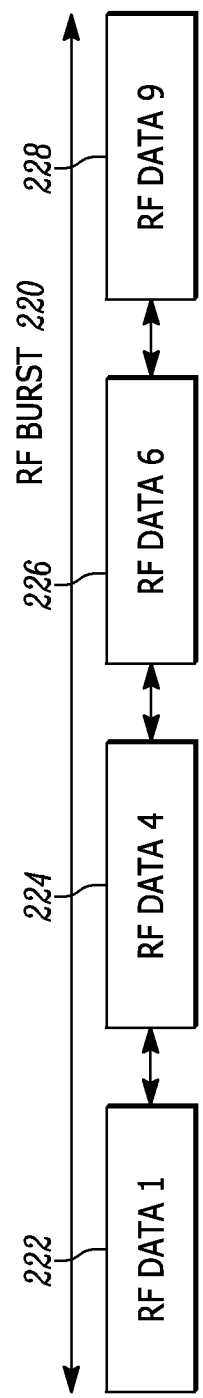

Referring now to FIG. 2B, a burst 220 is to be transmitted. The burst includes a first frame (RF data 1) 222, a second frame (RF data 4) 224, a third frame (RF data 6) 226, and a fourth frame (RF data 9) 228. The moving 100 ms window examines each frame and determines the averaging factor for each of the frames. In this case, the first frame (RF data 1) 222 has an averaging factor of 12; the second frame (RF data 4) 224 has an averaging factor of 20; the third frame (RF data 6) 226 has an averaging factor of 15; and the fourth frame (RF data 9) 228 has an averaging factor of 19.

Each of these frames is transmitted with maximum peak power of 67.66 db uV/m (for 315 Mhz) or 72.86 db uV/m (for 433.92 Mhz) plus the averaging factor determined for each frame. In this way, a maximum probability is achieved for the vehicle receiver (e.g., receiver 104) receiving the burst and the frames within the burst. Put still another way, all frames are transmitted with a power tailored to the frame and not limited but the worst case power averaging factor for an individual frame.

Figure 3A:
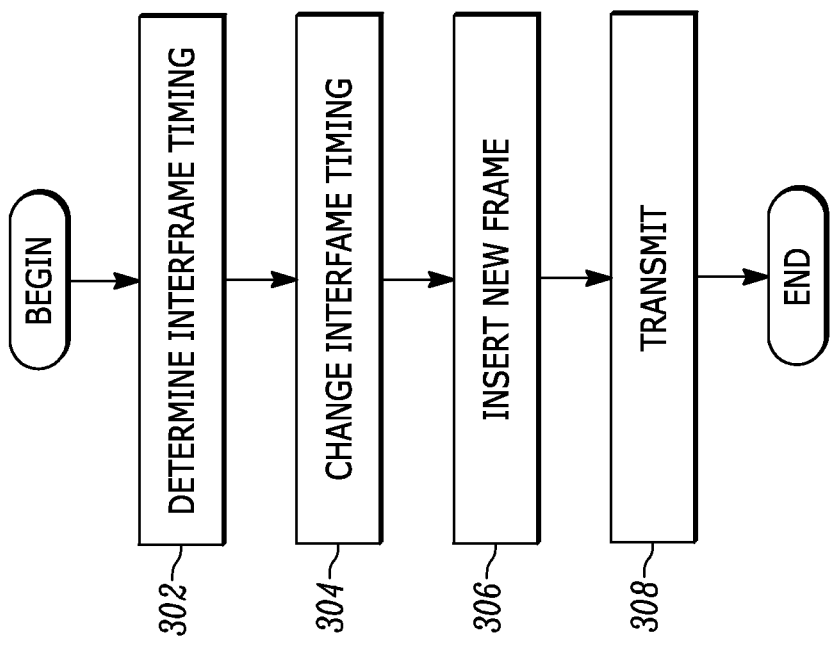
FIG. 3A and 3B comprises a flowchart and block diagram showing one approach to transmitting TPM data according to various embodiments of the present invention.

Referring now to FIG. 3A, another approach for transmitting information from a TPMS sensor is described. At step 302, the TPM sensor determines the inter frame timing between frames in a burst. That is, the sensor determines the amount of empty space (in time units) between frames to be transmitted.

At step 304, the TPM sensor changes the inter frame timing so as to shorten the inter frame timing. The amount by which the inter frame time is shortened may be based upon a variety of factors such as the length of the burst and the amount of time taken by frames in the burst.

At step 306, the TPM sensor inserts a new frame at the end of the burst. The new frame may be a duplicate frame of an earlier frame in the burst or may be a new frame including additional information not included with any of the existing frames. At step 308, the transmission of all frames (old and new) is made with a maximum peak power associated with the frame with the worst averaging factor.

Figure 3B:
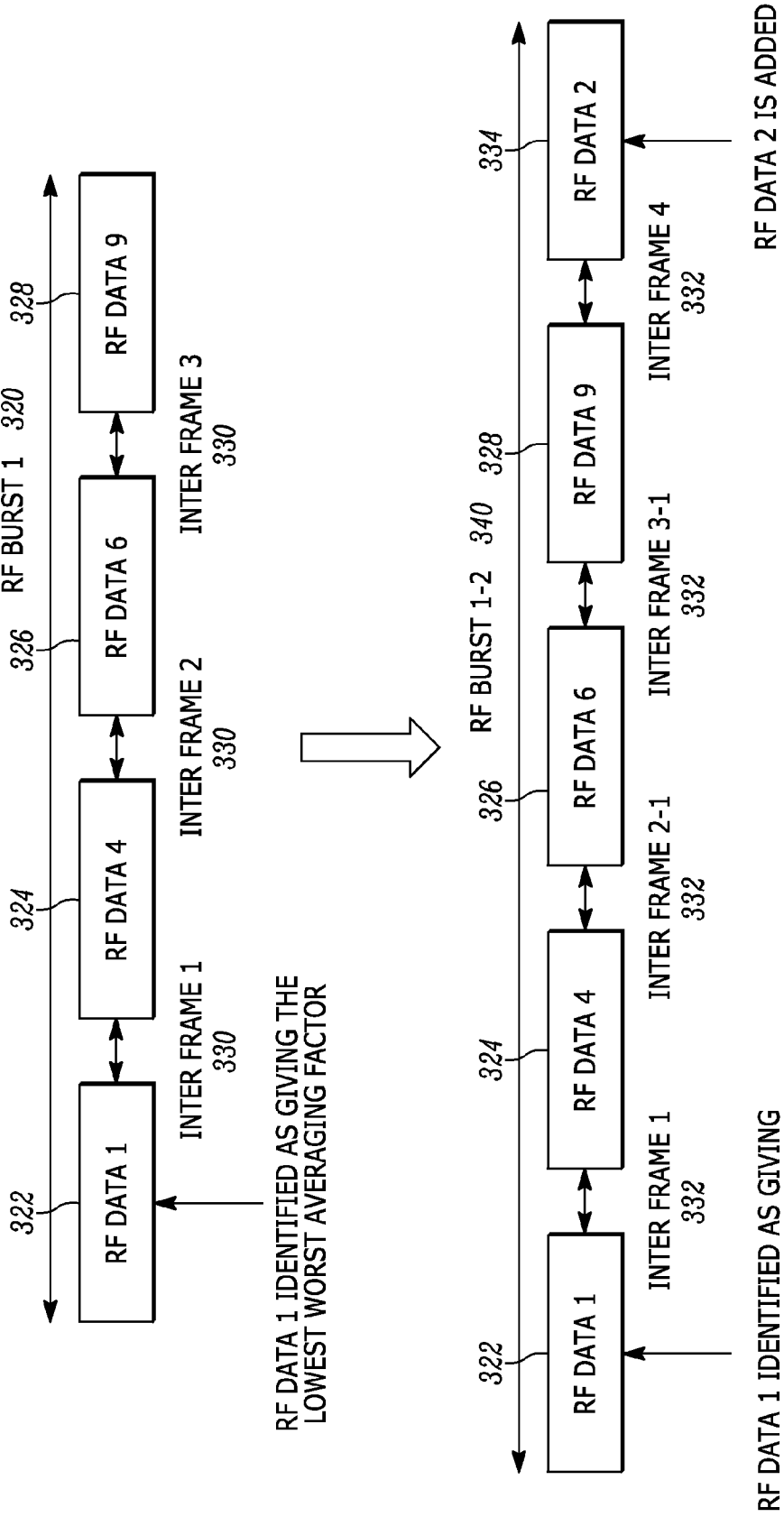

To take one example and as shown in FIG. 3B, a burst 320 is received and includes a first frame (RF data 1) 322, a second frame (RF data 4) 324, a third frame (RF data 6) 326, and a fourth frame (RF data 9) 328. The moving 100 ms window examines the averaging factor for each of the frames. The first frame (RF data 1) 322 has an averaging factor of 12; the second frame (RF data 4) 324 has an averaging factor of 20; the third frame (RF data 6) 326 has an averaging factor of 15; and the fourth frame (RF data 9) 328 has an averaging factor of 19. Each of these frames is transmitted with maximum peak power of 67.66 db uV/m (for 315 Mhz) or 72.86 db uV/m (for 433.92 Mhz) plus the worst case averaging factor. In this case, the worst case is 12 and each frame and each burst is transmitted with this averaging power. Consequently, the frames are all transmitted at 67.66 plus 12 or 72.86+12 db uV/m (depending upon the frequency).

Each of the frames is separated by a first timing distance 330. The first timing distance 330 is reduced to a second timing distance 332, where second timing distance 332 is less than the first timing distance 330. An additional frame 334 is added by the TPM sensor. The additional frame 334 may include new information not included in the other frames, or it may be a duplicate of one of the other frames.

After the averaging factor is determined for each of the frames, then all frames are transmitted with the worst case averaging factor, and with the second timing distance and the additional frame. The frames 322, 324, 326, 328, and 334 with timing distance 332 are transmitted as burst 340.

Figure 4A:
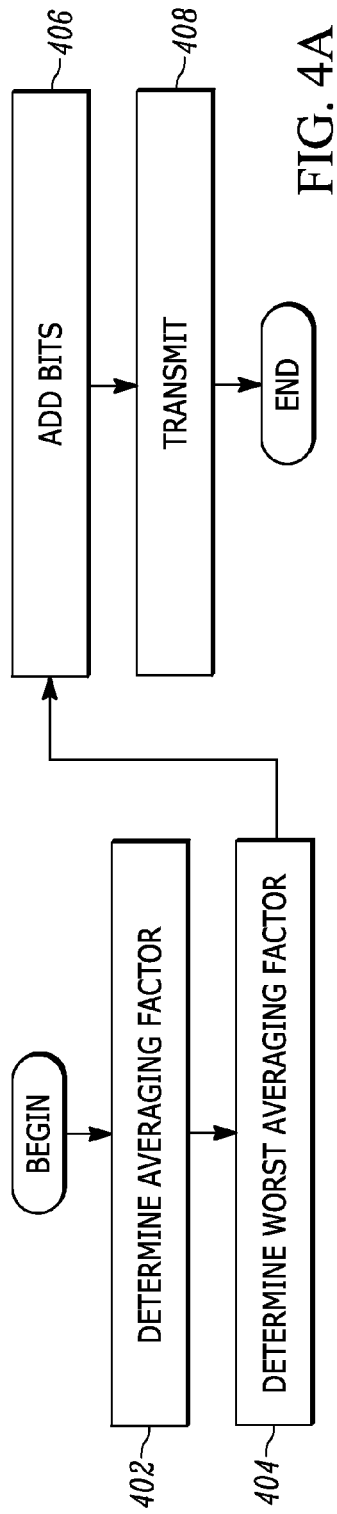
FIG. 4A and 4B comprises a flowchart and block diagram showing one approach to transmitting TPM data according to various embodiments of the present invention.

Referring now to FIG. 4A, another approach for transmitting information from a TPMS sensor is described. At step, 402, the TPM sensor determines the averaging factor for each frame. At step 404, determine the worst averaging factor and the frame associated with the worst averaging factor are determined. At step 406, add additional bits to the preamble of the frames that do not have the worst case averaging power. At step 408, transmissions are made of the burst with including the added bits of the selected frames.

Figure 4B:
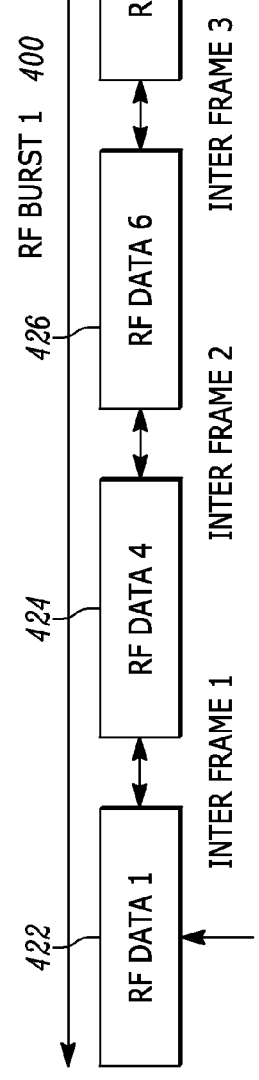

In one example and as shown in FIG. 4B, a burst 400 is received and includes a first frame (RF data 1) 422, a second frame (RF data 4) 424, a third frame (RF data 6) 426, and a fourth frame (RF data 9) 428. The moving 100 ms window examines the averaging factor for each of the frames. The first frame (RF data 1) 422 has an averaging factor of 12; the second frame (RF data 4) 424 has an averaging factor of 20; the third frame (RF data 6) 426 has an averaging factor of 15; and the fourth frame (RF data 9) 428 has an averaging factor of 19. Each of these frames is to be transmitted with maximum peak power of 67.66 db uV/m (for 315 Mhz) or 72.86 db uV/m (for 433.92 Mhz) plus the worst case averaging factor. In this case, the worst case is 12 and each frame and each burst is transmitted with this averaging power. Consequently, the frames are all transmitted at 67.66 plus 12 or 72.86+12 db uV/m (depending upon the frequency).

Before transmission as burst 440, frames that do not have the worst case averaging factor have bits inserted into their preambles. In this example, the second frame (RF data 4) 424 has an averaging factor of 20, the third frame (RF data 6) 426 has an averaging factor of 15, and the fourth frame (RF data 9) 428 has an averaging factor of 19, and all of these have additional bits stuffed in their preambles. The additional bits in the preamble makes synchronization between the transmitter of the TPM sensor and the receiver (the ECU) easier to achieve.

Figure 5:
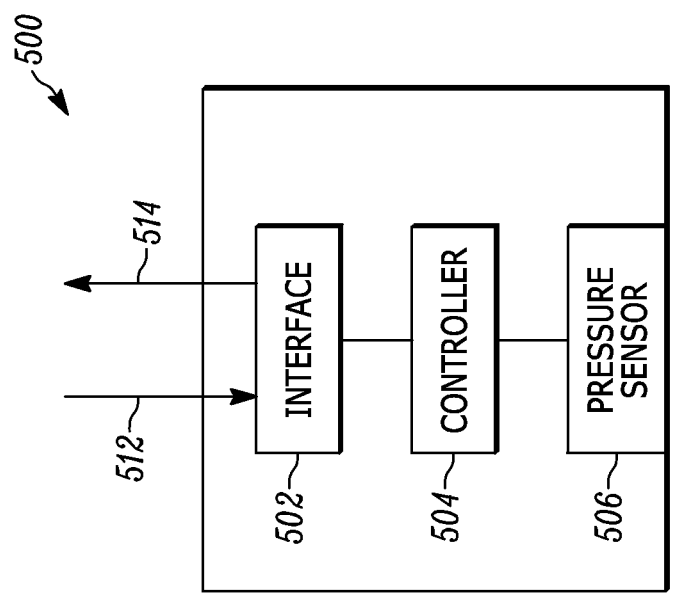
FIG. 5 comprises a block diagram of a TPM sensor according to various embodiments of the present invention.

Referring now to FIG. 5, one example of a TPM sensor or apparatus 500 is described. The TPM sensor 500 includes an interface 502, a controller 504, and a pressure sensor 506. In some example, the sensor 502 may also include a temperature sensor. The controller 504 is coupled to the interface and the pressure sensor 506.

In some examples, the interface 502 has an input 512 and output 514, and the input 512 configured to receive a plurality of frames to be transmitted. The controller 504 is configured to determine an averaging factor for each frame and to transmit at the output 514 each frame with the averaging power determined for each frame and not with the worst case averaging power from the plurality of frames.

In some examples, the input 512 is configured to receive a plurality of frames, each of the frames being separated by a first inter frame timing distance. The controller 504 is configured to determine the averaging factor for each of the plurality of frames and a worst case averaging factor. The controller 504 is further configured to determine a second inter frame timing distance that separates each of the plurality of frames, the second inter frame timing distance being less than the first inter frame timing distance. The controller 504 is configured to assemble the frames into a transmission burst and separate these frames with the second inter frame timing distance. The controller 504 is further configured to insert an additional frame into the transmission burst and transmit the transmission burst at the output 514 of the interface 502, each frame of the transmission burst being transmitted with the worst case averaging factor of the plurality of frames.

In some examples, the input 512 is configured to receive a plurality of frames to be transmitted, each of the first frames being separated by a first inter frame timing distance. The controller 504 is configured to determine an averaging factor for each frame, a worst case averaging factor for the plurality of frames, and the frame associated with the worst case averaging factor. The controller 504 is further configured to assemble the first frames to be transmitted into a transmission burst, to insert additional bits into the preamble of selected frames in the transmission burst, and to transmit the transmission burst at the output 514 with the worst case averaging power.

It should be understood that any of the devices described herein (e.g., the controllers, the receivers, the transmitters, the sensors, any presentation or display devices, or the external devices) may use a computing device to implement various functionality and operation of these devices. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method of increasing transmission performance between a tire pressure monitoring sensor and a receiver in a vehicle, the method comprising:
   receiving a plurality of frames to be transmitted, each of the plurality of frames being separated by a first inter frame timing distance;
   determining an averaging factor for each of the plurality of frames, and a worst case averaging factor;
   determining a second inter frame timing distance that separates each of the plurality of frames, the second inter frame timing distance being less than the first inter frame timing distance;
   assembling the frames into a transmission burst and separating these frames with the second inter frame timing distance;
   inserting an additional frame into the transmission burst;
   transmitting each of the frames of the transmission burst with the worst case averaging factor.

2. The method of claim 1, wherein each frame is transmitted to a receiver in the vehicle.

3. The method of claim 2, wherein the receiver makes a decision as to whether the pressure is below a predetermined threshold.

4. The method of claim 1, wherein each of the frames has a protocol of a different automobile manufacturer.

5. The method of claim 1, wherein the frames are transmitted at approximately 315 Mhz or at approximately 433.92 Mhz.

6. The method of claim 1, wherein the additional frame is duplicative of one of the first frames.

7. The method of claim 1, wherein the additional frame includes additional information from the first frames.

8. A method of increasing transmission performance between a tire pressure monitoring sensor and a receiver in a vehicle, the method comprising:
   receiving a plurality of frames to be transmitted each of the frames being separated by a first inter frame timing distance;
   determining an averaging factor for each frame, a worst case averaging factor, and a frame associated with the worst case averaging factor;
   assembling the frames to be transmitted into a transmission burst;
   inserting additional bits into the preamble of selected frames in the transmission burst;
   transmitting the transmission burst with averaging power determined for worst case averaging power from the plurality of frames.

9. The method of claim 8, wherein the selected frames do not have the worst case averaging factor.

10. An apparatus configured to increase transmission performance between a tire pressure monitoring sensor and a receiver in a vehicle, the method comprising:
    an interface with an input and an output, the input configured to receive a plurality of frames, each of the frames being separated by a first inter frame timing distance;
    a controller coupled to the interface, the controller configured to determine the averaging factor for each of the plurality of frames and a worst case averaging factor, the controller configured to determine a second inter frame timing distance that separates each of the plurality of frames, the second inter frame timing distance being less than the first inter frame timing distance, the controller configured to assemble the frames into a transmission burst and separate these frames with the second inter frame timing distance, the controller configured to insert an additional frame into the transmission burst and transmit the transmission burst at the output of the interface, each frame of the transmission burst being transmitted with the worst case averaging factor of the plurality of frames.

11. The apparatus of claim 10, wherein the controller is configured to transmit each frame to a receiver in the vehicle.

12. The apparatus of claim 11, wherein the receiver makes a decision as to whether the pressure is below a predetermined threshold.

13. The apparatus of claim 10, wherein each of the frames has a protocol of a different automobile manufacturer.

14. The apparatus of claim 10, wherein the frames are transmitted at approximately 315 Mhz or at approximately 433.92 Mhz.

15. The apparatus of claim 10, wherein the additional frame is duplicative of one of the first frames.

16. The apparatus of claim 10, wherein the additional frame includes additional information from the first frames.

17. An apparatus configured to increase transmission performance between a tire pressure monitoring sensor and a receiver in a vehicle, the apparatus comprising:
an interface with an input and an output, the input configured to receive a plurality of frames to be transmitted, each of the first frames being separated by a first inter frame timing distance;
a controller coupled to the interface, the controller configured to determine an averaging factor for each frame, a worst case averaging factor for the plurality of frames, and the frame associated with the worst case averaging factor, the controller configured to assemble the first frames to be transmitted into a transmission burst, the controller configured to insert additional bits into the preamble of selected frames in the transmission burst and to transmit the transmission burst at the output with worst case averaging power.

18. The apparatus of claim 17, wherein the selected frames do not have the worst case averaging factor.

* * * * *